(12) United States Patent
Koo

(10) Patent No.: US 8,843,517 B1
(45) Date of Patent: Sep. 23, 2014

(54) SYSTEM AND METHOD FOR SCALABLE HIGH SPEED DISTRIBUTIVE DATA STORAGE AND RETRIEVAL

(75) Inventor: Sing Koo, Cupertino, CA (US)

(73) Assignee: Narus, Inc., Sunnyvale, CA (US)

( * ) Notice: Subject to any disclaimer, the term of this patent is extended or adjusted under 35 U.S.C. 154(b) by 231 days.

(21) Appl. No.: 13/153,342

(22) Filed: Jun. 3, 2011

(51) Int. Cl.
*G06F 17/30* (2006.01)
*G06F 7/00* (2006.01)

(52) U.S. Cl.
USPC ............ 707/770; 707/652; 707/694; 707/741

(58) Field of Classification Search
None
See application file for complete search history.

(56) References Cited

U.S. PATENT DOCUMENTS

| 5,548,757 | A * | 8/1996 | Matsuyama et al. ................... 1/1 |
| 7,975,061 | B1 * | 7/2011 | Gokhale et al. ............... 709/231 |
| 2005/0050198 | A1 * | 3/2005 | Mizoguchi ................... 709/224 |
| 2010/0202508 | A1 * | 8/2010 | Karaoguz et al. ........ 375/240.01 |

* cited by examiner

*Primary Examiner* — Sangwoo Ahn
(74) *Attorney, Agent, or Firm* — Fernandez & Associates, LLP

(57) ABSTRACT

A high speed data storage system including a logical disk that is implemented from disk systems (i.e., physical disk storage devices and associated controllers) that operate at speed lower than the input data rate. The logical disk supports the input data rate by multiplexing streaming data onto multiple physical disk storage devices. The resulting system has a logical read/write speed that is the sum of each of the disks participated in the storage system. Data written onto the data storage system can be retrieved directly, sequentially, or by means of advanced search techniques such as binary search or skip sequential search.

21 Claims, 7 Drawing Sheets

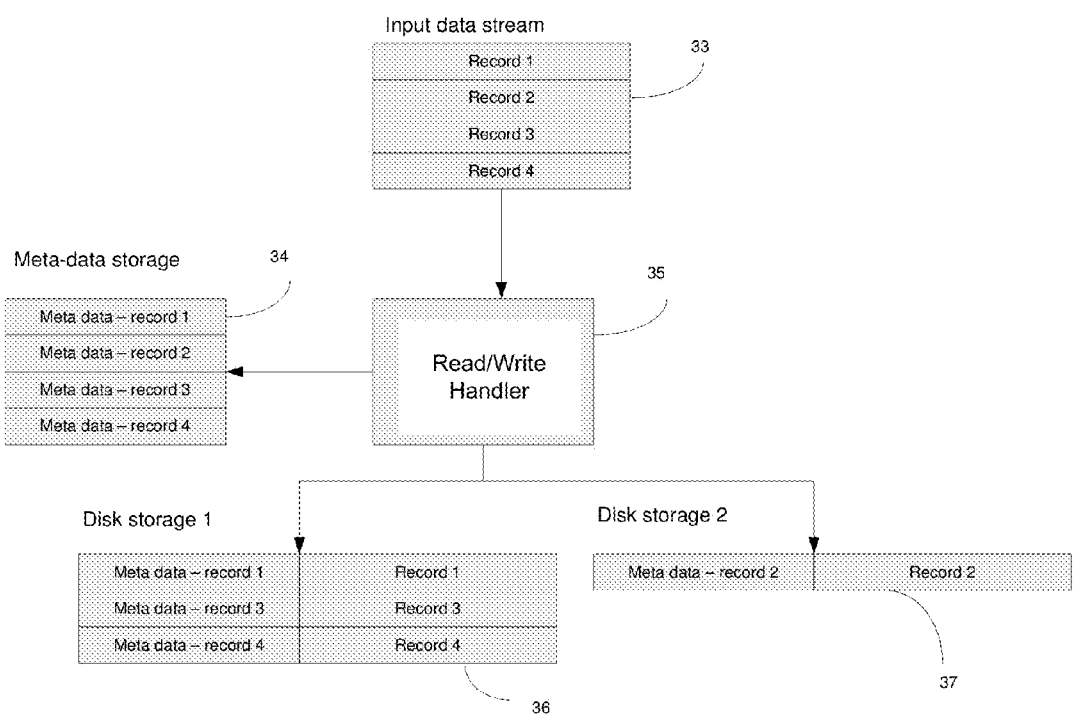

SYSTEM AND METHOD FOR SCALABLE HIGH SPEED DISTRIBUTIVE DATA STORAGE AND RETRIEVAL

BACKGROUND OF THE INVENTION

1. Field of the Invention

The present invention relates to computers and computer networks. More particularly, the invention relates to scalable high speed distributive data storage and retrieval in a computer network environment.

2. Background of the Related Art

With the proliferation of computer networks such as the Internet, voluminous amount of data is generated continuously by a new generation of application such as messaging services, blogs, logs, and network monitors. Some of these applications can produce output data at a rate of several million bytes per second. Traditionally, computer disk storage offers a reasonable speed for applications to store its data. Such storage is no longer adequate to meet the demand of these new applications. To amplify the problem further, network speed is increasing at a much faster rate than that of disk systems while the need to perform parallel distributive processing on these huge dataset is becoming more the norm than exception. It becomes essential for enterprise to look for alternate storage solutions. Many modern operating systems and data management systems provide high speed data storage and retrieval solution built on top of an underlying file systems. As more features are added to the basic file system such as distributive access, indexed access, indexed sequential access, or hash access, the time necessary to access data rises quickly.

Output generated by computer programs is generally produced in the form of a sequence of data records. Such sequence of data records is destined for devices such as printer, disk storage, network adapter, or display monitor. When data is destined for disk, it is normally cached in a buffer before written onto the disk. When the cache is full, cached data must be flushed onto the physical storage before the program can continue. In the mean time, execution of the program will be blocked until the storage device is ready for more data. This method can only be used to handle output data at a rate that is less than the maximum rate of the storage device. The assumption is that the program can wait for the output device to be available before writing to it again. For the program executing in a network data capture device where each captured byte must be stored based on the network data rate, the program can no long wait for the disk device to flush its cache without risking data loss. Said in other words, operations of such program require data to be written in a continuous stream fashion without waiting for the disk storage where conventional means to write data to disk is no longer adequate.

FIG. 1 shows a conventional data flow diagram where an application program (2) reads data from a synchronous input device (1) and writes the data to the disk storage device (3). The application program (2) has control over reading of the incoming data from the synchronous input device (1), and therefore is able to wait (i.e., halt an incoming data stream) when the disk storage device (3) falls behind. Such read and write operations are referred to as synchronized (or synchronous) read and write, respectively.

FIG. 2 shows a conventional dataflow diagram where real time data is received from an asynchronous high speed data adapter (4) and is written to disk storage device (6) after it is processed by application program (5). When the incoming or output data rate reaches maximum throughput rate (e.g., limited by the disk storage device (6)), data loss or process anomaly will occur if the asynchronous high speed data adapter (4) is receiving data on a continuous basis. Such read and write operations are referred to as asynchronous read and write, respectively.

SUMMARY

In general, in one aspect, the present invention relates to a method for data storage. The method includes obtaining, by a processor of a computer system, first and second data records in a data stream, generating, by the processor and using a pre-determined algorithm for multiplexing a plurality of storage devices, first and second meta-data identifying first and second locations, respectively, in the plurality of storage devices to store the first and second data records, respectively, storing, based on the first and second meta-data, the first and second data records concurrently in the first and second locations, respectively, wherein first and second write elapse time to store the first and second data records, respectively, are overlapped, storing the first and second meta-data in a data store, wherein the first and second meta-data are indexed in the data store based on first and second identifiers of the first and second data records, respectively, and retrieving, based on the first and second identifiers, the first and second data records concurrently from the plurality of storage devices using the first and second meta-data, respectively, wherein first and second read elapse time to retrieve the first and second data records, respectively, are overlapped.

In general, in one aspect, the present invention relates to a system for data storage. The system includes a plurality of storage devices, a processor and memory storing instructions, when executed by the processor comprising functionality to obtain first and second data records in a data stream, generate, using a pre-determined algorithm for multiplexing the plurality of storage devices, first and second meta-data identifying first and second locations, respectively, in the plurality of storage devices to store the first and second data records, respectively, store, based on the first and second meta-data, the first and second data records concurrently in the first and second locations, respectively, wherein first and second write elapse time to store the first and second data records, respectively, are overlapped, store the first and second meta-data in a data store, wherein the first and second meta-data are indexed in the data store based on first and second identifiers of the first and second data records, respectively, and retrieve, based on the first and second identifiers, the first and second data records concurrently from the plurality of storage devices using the first and second meta-data, respectively, wherein first and second read elapse time to retrieve the first and second data records, respectively, are overlapped.

In general, in one aspect, the present invention relates to a non-transitory computer readable medium storing instructions, when executed by the computer to perform data storage, the instructions include functionality for obtaining first and second data records in a data stream, generating, using a pre-determined algorithm for multiplexing a plurality of storage devices, first and second meta-data identifying first and second locations, respectively, in the plurality of storage devices to store the first and second data records, respectively, storing, based on the first and second meta-data, the first and second data records concurrently in the first and second locations, respectively, wherein first and second write elapse time to store the first and second data records, respectively, are overlapped, storing the first and second meta-data in a data store, wherein the first and second meta-data are indexed in the data store based on first and second identifiers of the first and second data records, respectively, and retrieving, based on the first and second identifiers, the first and second data records concurrently from the plurality of storage devices using the first and second meta-data, respectively, wherein first and second read elapse time to retrieve the first and second data records, respectively, are overlapped.

Other aspects and advantages of the invention will be apparent from the following description and the appended claims.

BRIEF DESCRIPTION OF DRAWINGS

FIG. 8 shows an application example according to aspects of the invention.

DETAILED DESCRIPTION

Figure 1:
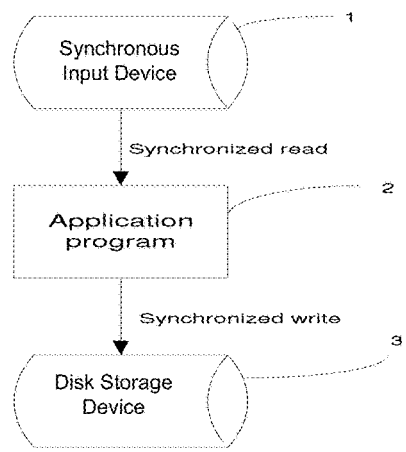
FIGS. 1 and 2 show prior art data diagram of a disk storage system.
Figure 2:
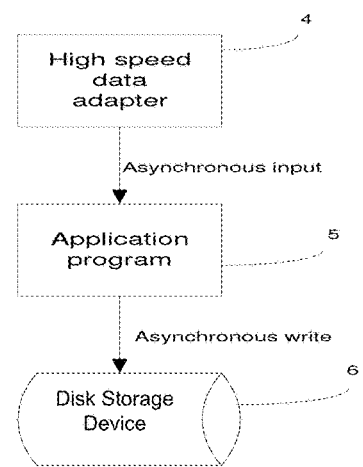

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments of the invention provides a light weight data access scheme that enables recording of large volume of high speed streaming data and retrieving thereof. Specifically, the light weight data access scheme relates to a storage system that meets the requirement of distributive, high speed streaming read/write, and direct access of data records of variable length.

In one or more embodiments, the high speed data storage system includes a logical disk that is implemented from disk systems (i.e., physical disk storage devices and associated controllers) that operate at speed lower than the input data rate. The logical disk supports the input data rate by multiplexing streaming data onto multiple physical disk storage devices. The resulting system has a logical read/write speed that is the sum of each of the disks participated in the storage system. Data written onto the data storage system can be retrieved directly, sequentially, or by means of advanced search techniques such as binary search or skip sequential search. The time required for each of these accesses is a small fraction of that found in common database management systems. The system also provides a distributive mechanism for fast replication of streaming data to multiple host nodes each containing a logical disk. Throughout this disclosure, the terms "disk," "storage device," and "disk storage device" may be used interchangeably based on the context.

Figure 3:
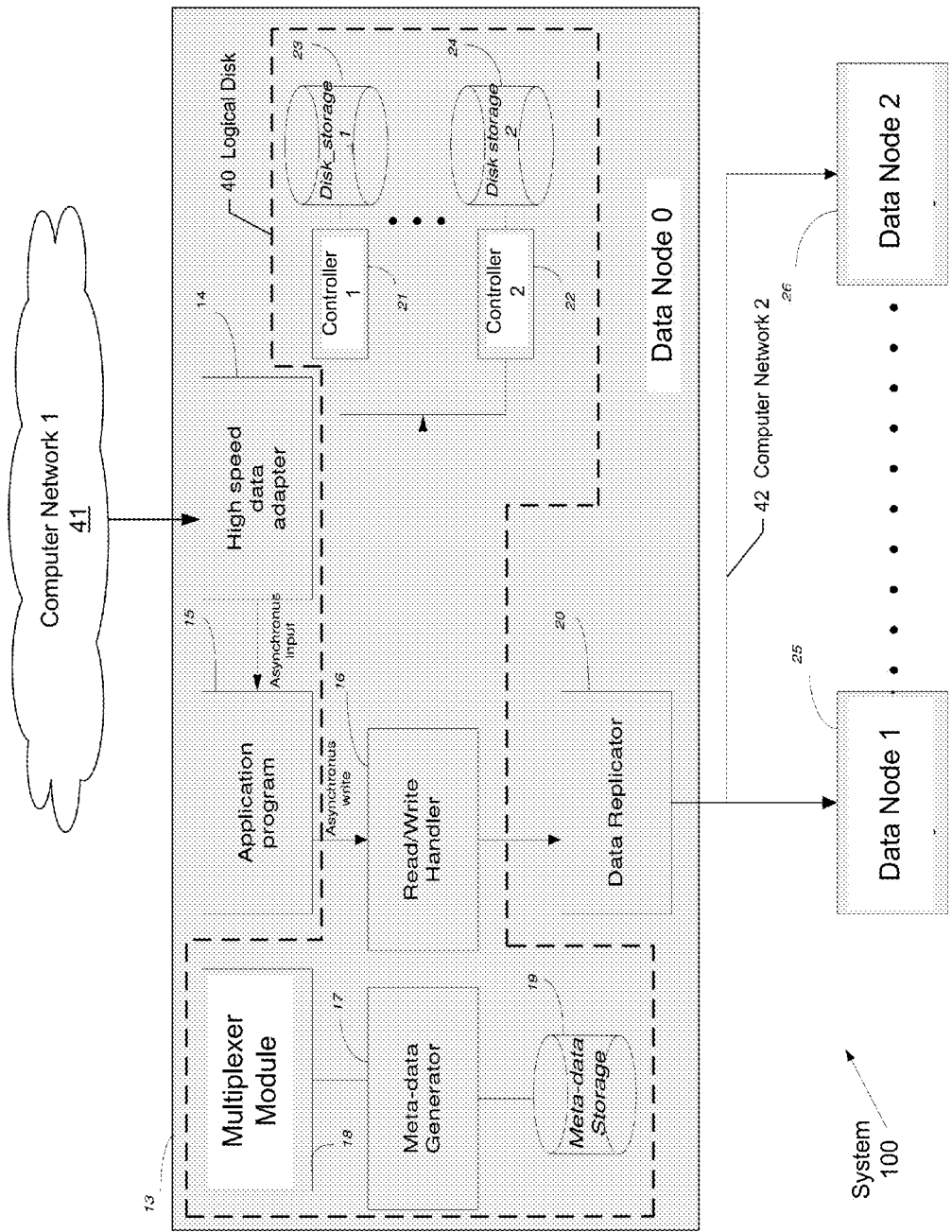
FIGS. 3-6 show system block diagrams according to aspects of the invention.

FIG. 3 shows a system block diagram of a system (100) in accordance with one or more embodiments of the invention. Those skilled in the art, having the benefit of this detailed description, will appreciate the components shown in FIG. 3 may differ among embodiments of the invention, and that one or more of the components may be optional or may be implemented as hardware, software, firmware, or combinations thereof. Although specific numbers of components are shown in FIG. 3, different number of each component may be included. In one or more embodiments of the invention, one or more of the components shown in FIG. 3 may be omitted, repeated, supplemented, and/or otherwise modified from that shown in FIG. 3. Accordingly, the specific arrangement of components shown in FIG. 3 should not be construed as limiting the scope of the invention.

As shown in FIG. 3, the system (100) includes computer nodes (e.g., node 0 (13), node 1 (25), node 2 (26), etc.) coupled via computer network 2 (42). Further, node 0 (13) is coupled to computer network 1 (41). For example, the computer network 1 (41) and/or computer network 2 (42) may include wired and/or wireless portions of the Internet and/or other data communications networks such as wide area networks (WANs), local area networks (LANs), etc. In one or more embodiments, the computer network 2 (42) may be coupled to the computer network 1 (41). In one or more embodiments, the computer network 2 (42) may a portion of the computer network 1 (41). As shown, node 0 (13) includes high speed data adapter (14), application program (15), read/write handler (16), meta-data generator (17), multiplexer module (18), meta-data storage (19), data replicator (20), controller 1 (21), controller 2 (22), disk storage 1 (23), and disk storage 2 (24). In particular, the read/write handler (16), meta-data generator (17), multiplexer module (18), meta-data storage (19), controller 1 (21), controller 2 (22), disk storage 1 (23), and disk storage 2 (24) together form a logical disk (40). Further, node 1 (25) and node 2 (26) include essentially the same components, which are described in reference to FIG. 6 below.

In one or more embodiments, node 0 (13) includes high speed data adapter (14) configured to obtain data (e.g., streaming data) from a data source. In one or more embodiments, the data source may provide incoming data stream captured from the computer network (41). Generally, the data stream, and each data record derived therefrom, includes multiple data items (e.g., data bytes). For example, the data stream may include email messages captured in real time. Although the high speed data adapter (14) is shown in the embodiment described above as obtaining data from the computer network (41), in other embodiments of the invention, the high speed data adapter (14) may be configured to obtain data from other suitable data source(s).

In one or more embodiments, the node 0 (13) includes application program (15) configured to process data obtained by the high speed data adapter (14). In an example, captured data over a particular time period may be organized by the application program (15) in conjunction with a data management system (not shown) of the node 0 (13) to form a data object (e.g., a logical file). In one or more embodiments, the data management system is a file system where the logical file is identified by a logical file name. For example, the application program (15) may be a part of the aforementioned data management system or a separate program executing in conjunction with the aforementioned data management system. In the embodiment shown in FIG. 1, the application program (15) is configured to perform asynchronous read and write operations between the high speed data adapter (14) and the logical disk (40). In other embodiments, the application program (15) may be configured to perform synchronous read and write operations between the high speed data adapter (14) and the logical disk (40). In one or more embodiments, the application program (15) is configured to access (e.g., read, write, etc.) a data object, or data records contained therein, in the logical disk (40) using a random access mode, a sequential access mode, or an advanced search mode such as binary search or skip sequential search. In one or more embodiments, these various access modes are supported via application programming interface (API) of the logical disk (40). In particular, such API is implemented by the multiplexer module (13), meta-data generator (17), meta-data storage (19), and read/write handler (16) as described below. Examples In one or more embodiments, the application program (15), in conjunction with the read/write handler (16), parses the data object (e.g., logical file) into data records. In the example where the data object contains captured email messages, each data record may be an email message. Within the data management system (e.g., file system), each data record (e.g., email message) is assigned a data record identifier. For example, the data record identifier may be a unique number (e.g., a sequence number referred to as the ordinal number) of each data record (e.g., email) as recognized within the file system. In another example, the data record identifier may be a combination of (i) a data object identifier (e.g., logical file name) of the data object (e.g., logical file) and (ii) a unique number (e.g., a sequence number) of each data record (e.g., email) within the data object (e.g., logical file). Specifically, the application program (15) references the data records using the data record identifiers assigned within the aforementioned data management system. Examples of the application program (15) includes network traffic profiling application, network data compression application, network traffic signature generation and classification application, etc.

In one or more embodiments, the logical disk (40) includes multiplexer module (18) configured to implement a pre-determined algorithm for multiplexing a set of storage devices (e.g., disk storage 1 (23) and disk storage 2 (24) as well as associated controller 1 (21) and controller 2 (22)) to store the data records processed by the application program (15). For example, the multiplexer module (18) receives a data record identifier used by the application program (15) to reference a data record and, in response, determines a physical file path pointing to a physical file in one of the multiplexed storage devices (e.g., disk storage 1 (23) or disk storage 2 (24)) for storing the data record. In one or more embodiments, such physical file is pre-configured before any data record is stored therein. Specifically, the physical file path is determined using the aforementioned pre-determined algorithm such that aggregated throughput (i.e., data rate) of the multiplexed disk storage devices exceeds the incoming data rate to the high speed data adapter (14). Accordingly, continuous recording of the streaming data (e.g., captured from the computer network (41)) is now possible using one or more physical disk storage devices having throughput less than the incoming streaming data rate.

In one or more embodiments, the pre-determined algorithm for multiplexing the disk storage devices includes a weighted round robin multiplex scheme based on the read/write throughput of each of the multiplexed disk storage devices (e.g., disk storage 1 (23) and disk storage 2 (24)) and the incoming data rate to the logical disk (40). In one or more embodiments, such read/write throughput is the same for each multiplexed disk storage device in the logical disk (40). In one or more embodiments, such read/write throughput is different for one or more multiplexed disk storage devices compared to other multiplexed disk storage devices in the logical disk (40). An example weighted round robin multiplex scheme used by the multiplexer module (15) is described in reference to FIG. 5 below.

In one or more embodiments, the logical disk (40) includes meta-data generator (17) configured to determine a physical location within the aforementioned physical file for storing the data record. Specifically, the meta-data generator (17) determines such physical location prior to storing the data record. In one or more embodiments, the physical location is represented as meta-data containing the physical file path, a length of the data record, and an offset representing a next available position in the physical file for storing the data record. For example, the physical file path contained in the meta-data may be a full (i.e., non-hierarchical or flattened) physical file path name uniquely identifying the physical file in node 0 (13). For example, the next available position in the physical file may be a current end-of-file position in the physical file. In particular, the data record is stored in the physical location starting from this next available position as a result of appending the data record to the physical file. In this example, the current end-of-file position is advanced by the length of the data record in response to appending the data record to the physical file. An example meta-data is described in reference to FIG. 4 below.

In one or more embodiments, the logical disk (40) includes meta-data storage (19) configured to store the meta-data in a data store. For example, the meta-data may be indexed in the data store based on the data record identifier of the data record. Specifically, when the application program (15) presents the data record identifier to the logical disk (40), the corresponding meta-data is looked up in the meta-data storage (19) and used to calculate the physical location in the multiplexed disk storage devices (e.g., disk storage 1 (23) and disk storage 2 (24)) where the data record can be accessed.

In one or more embodiments, the logical disk (40) includes read/write handler (16) configured to access (e.g., write, read, store, retrieve, etc.) the data record to/from the multiplexed disk storage devices (e.g., disk storage 1 (23) and disk storage 2 (24)) using the meta-data. Due to the higher aggregated data rate from multiplexing the disk storage devices, elapse time for accessing multiple data records in separate multiplexed disk storage devices may be overlapped such that access to a second data record may be initiated prior to completion of a previously initiated access to a first data record. Said in other words, multiple data records may be accessed concurrently in separate multiplexed disk storage devices.

In one or more embodiments, when storing the data record, the read/write handler (16) also stores the corresponding meta-data in the physical location to form a composite data record for error checking purposes. More details of storing data records, retrieving data records, and validating retrieved data records are described in reference to FIG. 7 below.

In one or more embodiments, the node 0 (13) includes data replicator (20) configured to replicate the content of disk storage 1 (23), disk storage 2 (24), and meta-data storage (19) to other nodes (e.g., node 1 (25), node 2 (26), etc.) in the system (100) for distributive data storage purposes. For example, a client node (not shown) connected to the computer network (e.g., computer network 1 (41) and/or computer network 2 (42)) may access data records from a selected one of data storage nodes (e.g., node 0 (13), node 1 (25), node 2 (26), etc.) that is closest to the client node in the network topology.

In one or more embodiments, the node 0 (13) includes a processor (i.e., central processing unit (CPU)) (not shown) configured to execute instructions to operate the components (e.g., one or more of application program (15), read/write handler (16), meta-data generator (17), multiplexer module (18), etc.) of the node 0 (13) to implement various functionalities described above.

Based on the foregoing, given that the aggregated throughput of the multiplexed disk storage devices (i.e., disk storage 1 (23), disk storage 2 (24)) exceeds the incoming data rate to the logical disk (40), an example data flow in a continuous recording scenario of streaming data captured from the computer network 1 (41) is described here. Initially, the high speed data adapter (14) provides continuously captured streaming data to the application program (15). As soon as the streaming data is available from a communication buffer coupling the application program (15) and the high speed data adapter (14), the application program (15) reads the streaming data, organizes/processes it into one or more logical files (i.e., data objects), and passes these logical files to the read/write handler (16). The read/write handler (16) stores these logical files to disk storage 1 (23) and/or disk storage 2 (24) using the following procedure performed in conjunction with the application program (15) and the meta-data generator (17):

Step 1, logical boundaries of data within the logical file are determined.

Step 2, data in the logical file is parsed into a sequence of data records according to the logical boundaries.

Figure 4:
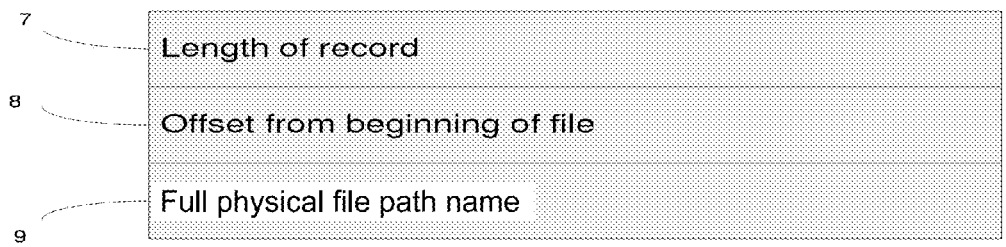

Step 3, for each data record, meta-data is generated to represent a physical location in the multiplexed disk storage devices where the data record is to be stored. In one or more embodiments, the meta-data includes a minimum of three elements. FIG. 4 shows an example layout of this meta-data containing a length of the data record (7), a full physical file path name (8) of the physical file that will contain the data record, and an offset (9) from the beginning of the physical file where the offset points to the next available position in the file for storing additional data. For example, the offset (9) may point to the end of file position of the physical file. In another example, the offset (9) may point to a pre-defined available position in a pre-formatted file based on a pre-defined file template.

In one or more embodiments, the meta-data generator (17) that creates this meta-data obtains a target physical file path name from the multiplexer (18). Target physical files reserved (e.g., in a library) for this purpose are pre-configured ahead of time in the example disk system shown in FIG. 3 with 2 physical disks (i.e., disk storage 1 (23) and disk storage 2 (24)) and 2 controllers (i.e., controller 1 (21) and controller 2 (22)). The actual number of disks and controllers is dependent on the effective recording speed that the storage system is required to achieve. Known properties (e.g., performance attributes) of the multiplexed disk storage devices are used to create a multiplexer table that is used by the multiplexer module (18) to direct sequential selection of one of the multiplexed disk storage devices when the sequence of data records in the logical file is traversed to generate the meta-data. For example, the sequence of data records may be traversed in a linear order such that meta-data of a first data record ahead of a second data record in the sequence is generated prior to the meta-data of the second data record. In another example, the sequence of data records may be traversed in a non-linear order (e.g., in a random order) when generating the meta-data. Regardless of the specific manner that the sequence of the data records is traversed when generating the meta-data, the target physical file included in a particular meta-data is determined to be in one of the multiplexed disk storage devices selected using the multiplexer table based on the position of the corresponding data record in the sequence of data records of the logical file. As described below using an example, the selected one of the multiplexed disk storage devices is selected based on a weighted round robin scheme that applies the multiplexer table to the sequence of data records of the logical file.

Figure 5:
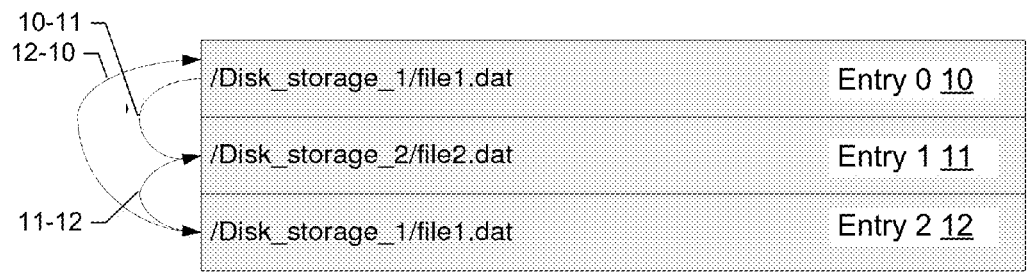

In one or more embodiments, each entry of the multiplexer table includes a parameterized physical file name in one of the disk storage devices. The entries are ordered in an alternating manner to alternate the associated disk storage device among all disk storage devices. In one or more embodiments, the number of occurrence of entries associated with (i.e., containing the parameterized physical file name in) each disk storage device is proportional to the performance attribute of the particular disk storage device. An example of this multiplexer table is shown in FIG. 5. In this example, disk storage 1 (23) has a performance (e.g., speed, throughput, or other performance attributes) that doubles the performance of disk storage 2 (24). Therefore, the example multiplexer table has twice as many entries associated with disk storage 1 (23) as that associated with disk storage 2 (24). As described below, the frequency of disk storage 1 (23) accesses (e.g., writing operations, reading operations, etc.) will be twice of the disk storage 2 (24) accesses when accessing (e.g., writing, reading, etc.) the logical files to/from the multiplexed disk storage devices. Specifically, the example multiplexer table contains three entries: entry 0 (10) containing a physical file name of physical file 1 in disk storage 1 (23), entry 1 (11) containing a physical file name of physical file 2 in disk storage 2 (24), and entry 2 (12) containing the physical file name of physical file 1 in disk storage 1 (23). Accordingly, based on a weighted round-robin scheme to iteratively traverse the multiplexer table according to the arrows (10-11), (11-12), and (12-10) between these three entries forming a circular linked list, the multiplexer module (18) returns target physical file path names to the meta-data generator (17), for generating the meta-data, in the following sequence along the circular linked list:

/Disk_storage_1/file1.dat,
/Disk_storage_2/file2.dat,
/Disk_storage_1/file1.dat,
/Disk_storage_1/file1.dat,
/Disk_storage_2/file2.dat,
/Disk_storage_1/file1.dat . . . .

As noted above, the meta-data may be generated sequentially (e.g., in the linear traversal example) based on a position of the data record in the sequence of data records of the logical file. In one or more embodiments, the sequence of generating meta-data is the same as the sequence of the data records in the logical file. Accordingly, the meta-data directs the data records to be stored in the multiplexed storage devices in the weighted round robin scheme described above according to the position of the data record in the sequence of data records of the logical file. In the example above with two disk storage devices in the disk system, file 1 and file 2 are parameterized physical file names representing a pair of pre-configured physical files each stored in one of disk storage 1 (23) and disk storage 2 (24). For each logical file, an instantiation of the parameterized physical file names are selected from a pre-configured physical file library by the multiplexer module (18) for the meta-data generator (17).

The generated meta-data is then saved into the meta-data storage (19) before returning it to the read/write handler (16). In one or more embodiments, the read/write handler (16) concatenates the meta-data with the data record to form a composite data record. It then appends the composite data record to the end of the file position in the physical file as identified by the meta-data.

Figure 6:
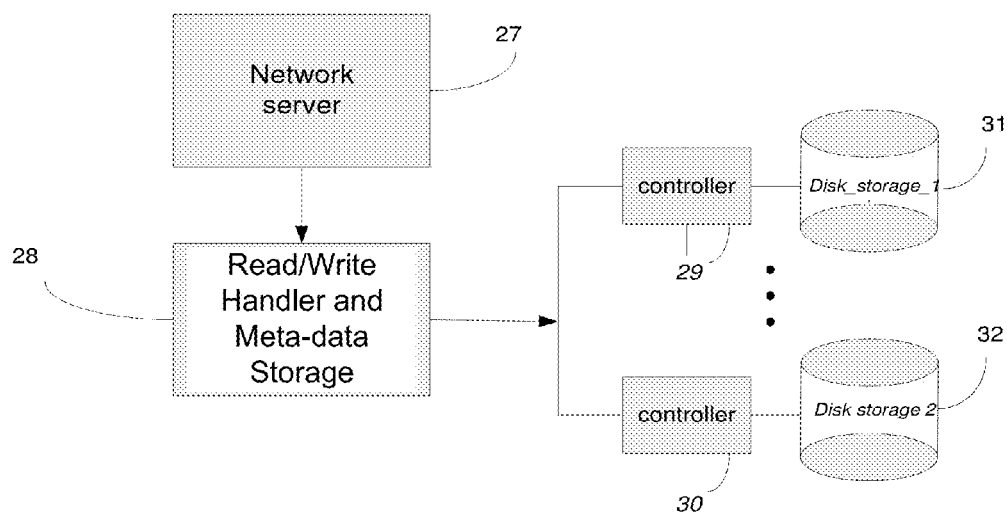

In one or more embodiments, the read/write handler (16) invokes the data replicator (20) to transmit the composite data record to the distributed data nodes (e.g., node 1 (25), node 2 (26)) for distributive file storage. For example, the data replicator (20) may act as a network client. As shown in FIG. 6, each of the remote data nodes (e.g., node 1 (25), node 2 (26)) includes network server (27), read/write handler and meta-data storage (28), and a physical disk system (29,31,30,32) including controllers (e.g., controller (29), controller (30), etc.) and associated disk storages (e.g., disk storage 1 (31), disk storage 2 (32, etc.). In particular, the read/write handler and meta-data storage (28) and the physical disk system (29, 31,30,32) are essentially the same as the read/write handler (16), meta-data storage (19), and the disk system including controllers (e.g., controller 1 (21), controller 2 (22), etc.) and associated disk storages (e.g., disk storage 1 (23), disk storage 2 (24)) of node 0 (13) shown in FIG. 3.

In one or more embodiments, a remote data node (e.g., node 1 (25), node 2 (26)) receives the composite data record using the network server (27), it then invokes the read/write handler and meta-data storage (28) to write the composite data record. The read/write handler and meta-data storage (28) reads the meta-data from the composite data record, obtains the 3 data elements from the meta-data. It then verifies the offset (8) with the current end-of-file of the physical file corresponding to the full physical file path name (9). Upon positive verification, the composite data record is written to the physical disk system (29,31,30,32) in a similar fashion as described above for node 0 (13).

As note above and shown in FIG. 6, in the remote data node (e.g., node 1 (25), node 2 (26)), the network server (27) answers the call from the replicator (20), and writes the composite data record to the physical disk system (29, 31, 30, 32). In one or more embodiments, the disks and controllers of the remote data node (e.g., node 1 (25), node 2 (26)) are identical to those of the main node 0 (13), therefore the composite data record requires no alteration, and can be applied in verbatim by the read/write handler and meta-data storage (28). Since meta data is already created by the main node 0 (13), the read/write handler and meta-data storage (28) extracts the 3 elements from the meta data and uses it to write to the physical disk system (29, 31, 30, 32) in the same way as described above for node 0 (13).

Figure 7A:
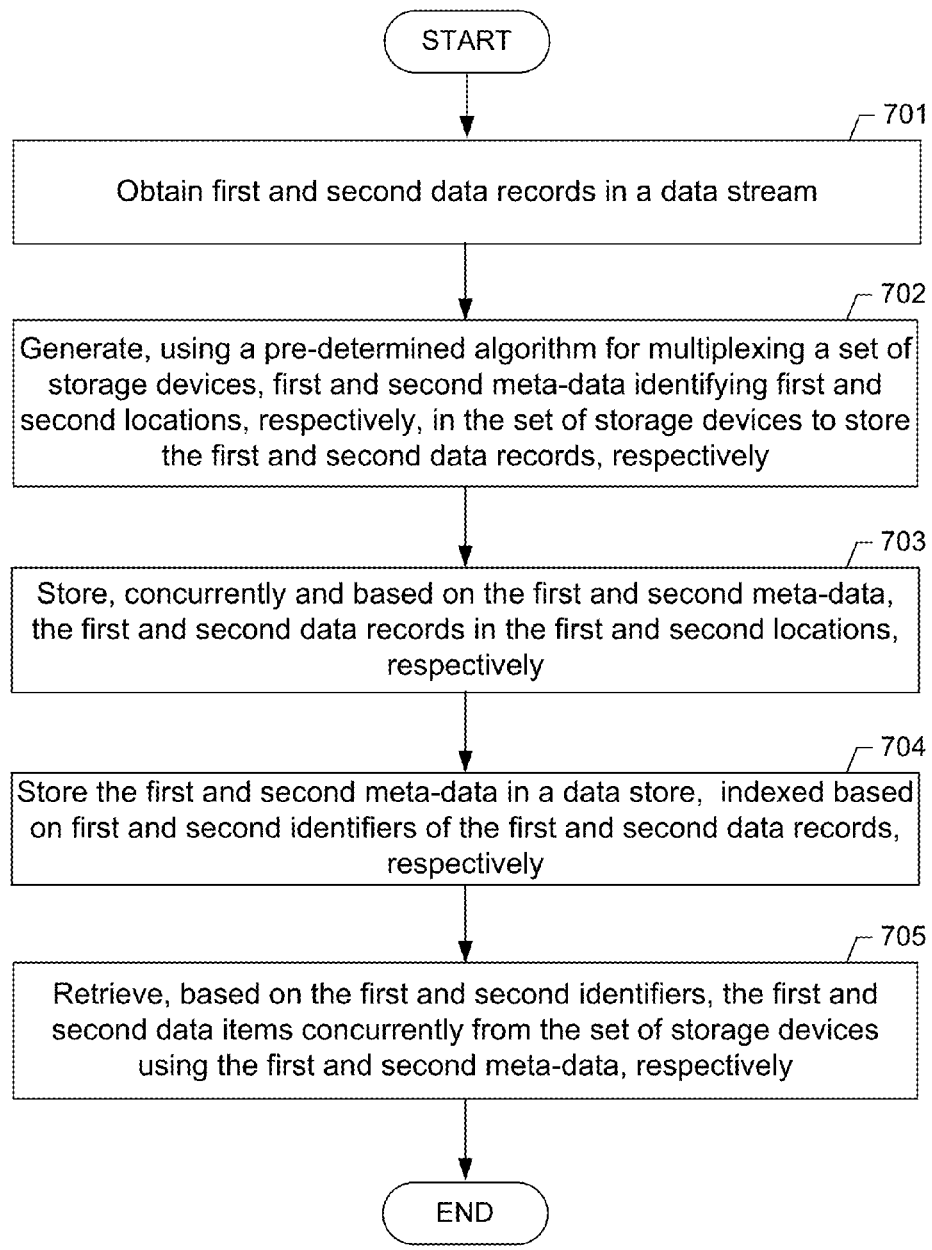
FIGS. 7A and 7B shows a flowchart of a method according to aspects of the invention.
Figure 7B:
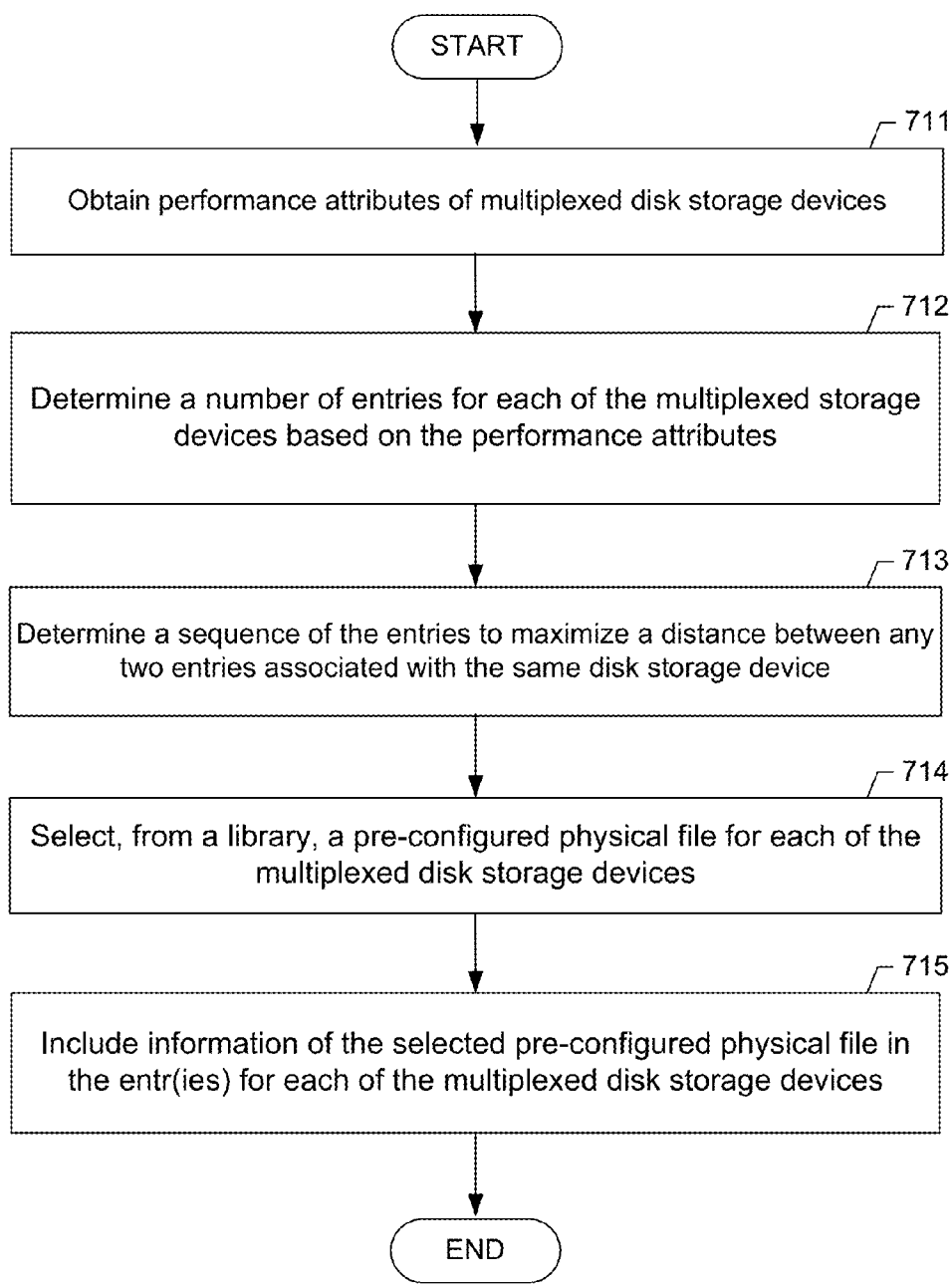
Figure 9:
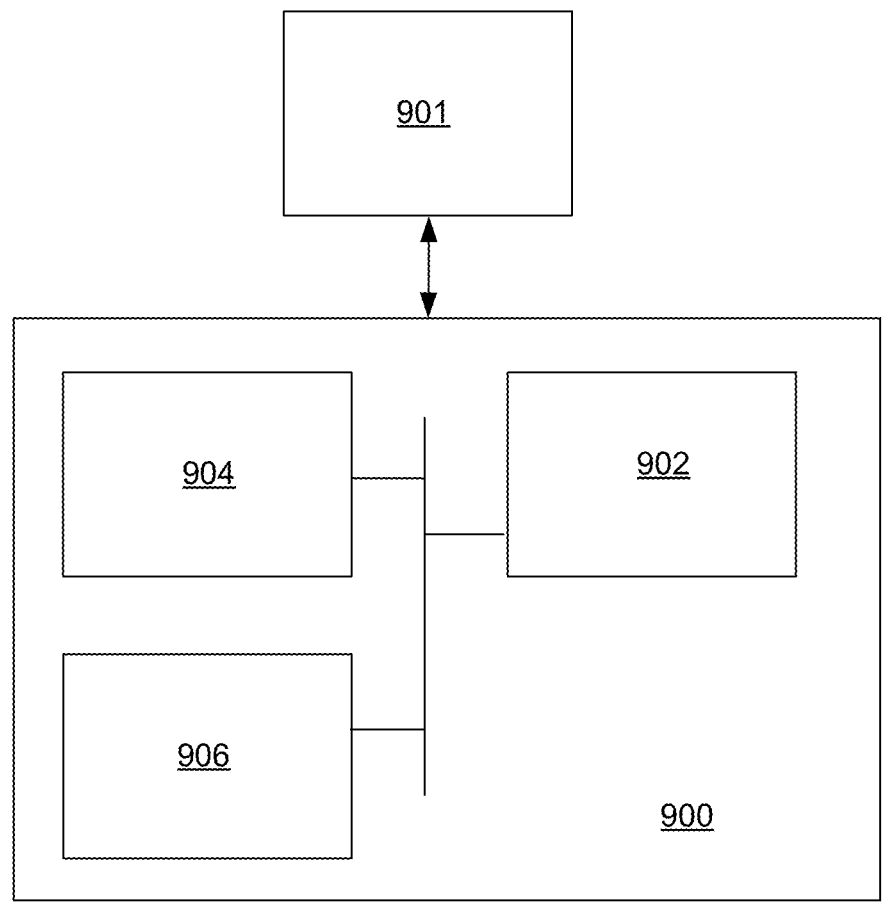
FIG. 9 shows a computer system according to aspects of the invention.

FIGS. 7A and 7B depict flowcharts of a method in accordance with one or more embodiments of the invention. In one or more embodiments of the invention, one or more of the steps shown in FIGS. 7A and 7B may be omitted, repeated, and/or performed in a different order. Accordingly, embodiments of the invention should not be considered limited to the specific arrangements of steps shown in FIGS. 7A and 7B. In one or more embodiments of the invention, the method depicted in FIGS. 7A and 7B may be practiced using system (100) described with respect to FIG. 3 above.

FIG. 7A shows a method to store and retrieve data records using a set of multiplexed disk storage devices, for example as described in reference to FIG. 3 above. Initially in Step 701, first and second data records are obtained in a data stream. For example, the data stream may be organized as one or more logical files in a file system. The logical file may then be parsed to generate a sequence of data records. For example, the first and second data records may be consecutive data records in the sequence of data records in the logical file and correspond to consecutive portions of the data stream. In another example, the first and second data records may not be consecutive data records in the sequence.

In Step 702, first and second meta-data are generated for the first and second data records identifying first and second locations, respectively, in a set of multiplexed storage devices to store the first and second data records, respectively. In one or more embodiments, the first and second meta-data are generated using a pre-determined algorithm for multiplexing the set of multiplexed storage devices. For example, the pre-determined algorithm may implement a weighted round robin multiplex scheme based on throughput of the first and second storage devices as well as the incoming data rate. An example weighted round robin scheme is described in reference to FIGS. 3 and 8.

In one or more embodiments, the pre-determined algorithm selects, from a pre-configured library, first and second physical file paths based on first and second sequential positions of the first and second data records, respectively, in the data stream or the logical file derived therefrom. In particular, the first physical file path points a first physical file containing the first location and stored in a first storage device of the multiplexed storage devices. Further, the second file physical path points to a second physical file containing the second location and stored in a second storage device of the multiplexed storage devices. An example of selecting the physical file paths are described in reference to FIGS. 3 and 8. An example meta-data layout is described in reference to FIG. 4. According to the example layout, the first meta-data includes the first physical file path, a length of the first data record, and an offset representing a next available position in the first physical file. The second meta-data includes similar components. In one or more embodiments, the next available position in the physical file is a current end-of-file position in the physical file. Accordingly, storing the first data record in the first location is a result of appending the first data record to the first physical file, which is also the same for storing the second data record. In each case, the current end-of-file position is advanced by the length of the respective data record in response to appending the data record to the respective physical file.

In Step 703, the first and second data records are stored concurrently in the first and second locations, respectively. Specifically, the first and second write elapse time to store the first and second data records, respectively, are overlapped. In one or more embodiments, each data record and associated meta-data are combined into a composite data record stored in the respective location. In one or more embodiments, the location for storing the data record is determined based on the associated meta-data using the respective physical file path and the next available position. In one example, the first and second data records may be consecutive data records in the logical file and are stored using a sequential access mode. In another example, the first and second data records may not be consecutive data records in the logical file and are stored using a random access mode.

In Step 704, the first and second meta-data are stored in a data store, as indexed based on the first and second identifiers of the first and second data records, respectively.

In Step 705, the first and second data records are retrieved, based on the first and second identifiers, respectively. These identifiers are used to look up corresponding meta-data from the meta-data store for calculating the respective physical location where the data records can be retrieved. Based on the multiplexing scheme described above, the first and second data record are retrieved concurrently from the multiplexed storage devices. Specifically, the first and second read elapse time to retrieve the first and second data records, respectively, are overlapped. In one example, the first and second data records may be consecutive data records in the logical file and are retrieved using a sequential access mode. In another example, the first and second data records may not be consecutive data records in the logical file and are retrieved using a random access mode.

In one or more embodiments where data records are stored together with associated meta-data, the meta-data may be retrieved together with the data record for validation purposes. Specifically, location information may be extracted from the retrieved meta-data and compared to the physical path and offset used to access the data record. Accordingly, an alert is generated if any mismatch is discovered. Otherwise, the retrieved data record is validated based on a matched comparison between the previous stored location information and the current location information used to retrieve the data record.

FIG. 7B shows a method to create a multiplex table, for example as described in reference to FIG. 5 above. Initially in Step 711, performance attributes of multiplexed disk storage devices are obtained. For example, the performance attributes may be data rate, throughput, etc. or a combination thereof. In Step 712, a number of entries is determined for each of the multiplexed storage devices based on the performance attributes. For example, if all multiplexed storage devices have the same performance attribute, the multiplex table may have one entry for each of the multiplexed storage devices. In another example, some of the multiplexed storage devices may have different performance attribute values than other multiplexed storage devices. In such case, each of the multiplexed storage devices may be assigned a number of entries in the multiplex table proportional to the performance attribute value of the multiplexed storage device. This example is illustrated in FIG. 5 using two multiplexed storage devices.

In Step 713, a sequence (i.e., order) of the entries is determined to maximize a distance measure between any two entries associated with the same disk storage device. Such alternating pattern is illustrated in FIG. 5 using two multiplexed storage devices. This alternating arrangement is to maximize the time period between any two consecutive accesses to the same multiplexed storage device during sequential access of data records in a logical file. Specifically, target physical locations used during sequential access of data records are looked up sequentially in the multiplex table resulting in an alternating access pattern to each of the two multiplexed storage devices.

In one or more embodiments, a distance measure may be defined for each disk storage device as a sum of each distance, in the circular linked list of entries, between any two entries associated with the disk storage device. Accordingly, the sequence of entries is arranged so as to maximize a sum of all distance measures corresponding to all multiplexed disk storage devices. For example in the multiplex file shown in FIG. 5, such distance measure for disk storage 1 (23) is 3 hops, which equals the 2 hops along arrows (10-11) and (11-12) from entry 0 (10) to entry 2 (12) added to the 1 hop along arrow (12-10) from entry (2) (12) back to entry 0 (10). The distance measure for disk storage 2 (24) is 3 hops along arrows (11-12), (12-10), and (10-11). Therefore, the maximized distance measure is 3+3 or 6 hops in defining the sequence in the multiplex table of FIG. 5. One skilled in the art, with the benefit of this disclosure, will recognize that other distance measure definitions may be equally applicable in determining the sequence of entries in the multiplex table to achieve the requirement of maximizing the time period between any two consecutive accesses to the same multiplexed storage device during sequential access of data records in a logical file.

In Step 714, a pre-configured physical file is selected for each of the multiplexed storage devices in the multiplex table. In one or more embodiments, the pre-configured physical file is selected from a library.

In Step 715, information of the selected pre-configured physical file is included in the entry. An example is illustrated in FIG. 5 using two pre-configured physical files. As shown, physical file path name "/Disk_storage_1/file 1.dat" is included in entry 0 (10) and entry 2 (12) for the disk storage 1 (23) twice the performance of the disk storage 2 (24). Physical file path name "/Disk_storage_2/file 2.dat" is included in entry 1 (11) only.

In one or more embodiments, each of the pre-configured physical files is a parameterized file. Specifically, an instantiation of the pre-configured physical file is created each time a logical file is stored such that data records in different logical files are separately stored in different physical files in each of the multiplexed storage devices.

FIG. 8 shows an example according to aspects of the invention. In this example, system (100) depicted in FIG. 3 is used as a recording device for a TCP/IP network. Specifically, the input data stream (33) to be recorded consists of a block of four records, namely record 1 through record 4. It is essential for such device to be scalable so that it can keep up with the network speed without data loss. The multiplexing scheme described above enables the recording speed to be increased by aggregation low speed disk devices, i.e., disk storage 1 (36) and disk storage 2 (37). As shown in FIG. 8, the input data stream (33) is captured from TCP/IP data packet stream. Since the record content is dependent on the payload carried by the data packets, record length varies for each of the record 1 through record 4. Each record is identified by an identifier consisting of a session ID and a time stamp. As data is recorded, the physical file path names for storing each data record are looked up in the multiplex table shown in FIG. 5 and used to generate the associated meta-data. For example, the meta-data is generated in the following sequence by iteratively traversing the multiplexer table shown in FIG. 5 according to the arrows (10-11), (11-12), (12-10), (10-11) . . .

Meta-data-record 1: [length of record=L1, offset=0, /Disk_storage_1/file 1.dat]
Meta-data-record 2: [length of record=L2, offset=0, /Disk_storage_2/file 2.dat]
Meta-data-record 3: [length of record=L3, offset=L1, /Disk_storage_1/file1.dat]
Meta-data-record 4: [length of record=L4, offset=L1+L3, /Disk_storage_1/file1.dat]

Note that the meta-data-record 4 is generated by traversing the multiplex table shown in FIG. 5 according to the arrow 12-10.

Further as shown in FIG. 8, read/write handler (35) is essentially the same as the read/write handler (16) described in reference to FIG. 3 above. Accordingly, the read/write handler (35) uses the meta-data above to calculate the physical locations to store record 1, record 3, and record 4 in disk storage 1 (36) and to store record 2 in the disk storage 2 (37).

Direct access (e.g., using a random access mode) of a record is accomplished by presenting the read/write handler (35) with the meta-data. The read/write handler (35) parses the meta-data to obtain the length, offset, and physical file path. This information is then used to access the record directly from the multiplexed disk storage devices. Indexed direct access is also available to chronological data. For example, the meta-data shown in FIG. 8 may be augmented to including an additional data field containing time stamp in addition to the length, offset, and physical file path. When searching for a record with a particular time stamp, instead of sequentially searching the timestamps of every record in the multiplexed disk storage devices, the meta-data storage serves as index to lookup records using binary search. For example, the binary search begins with retrieving the first meta-data (i.e., meta-data-record 1) from the meta-data storage (34) and then using it to access the actual record 1 from the multiplexed disk storage devices. If there is no match with the particular time stamp, the binary search proceeds to access the last record (i.e., meta-data-record 4) in the meta-data storage (34). If there is no match with the particular time stamp, the binary search continues with the mid-point (or an approximated mid-point for even number of entries) of meta-data storage (34). Iteratively, the binary search determines if any record exists in the multiplexed disk storage devices with the particular time stamp in a minimum number of accesses.

For sequential access of the data records, the meta-data storage (34) is used to retrieve the meta-data in a sequential manner. As each of the meta-data is retrieved, it is presented to the read/write handler (35) to retrieve the record. Specifically, the read/write handler (35) parses the meta-data to obtain the 3 elements shown in FIG. 4. The read/write handler (35) then uses the full file path name (9) to read the records starting from a location determined by the offset (8) and ending at a location determined by the length of the record (7). Once the composite record is retrieved, the meta-data is used to validate the record. Upon a match, the record is validated and returned to a requester.

Although specific formats or structures are used as examples in the foregoing description regarding data stream, data record and identifier thereof, meta-data and storage thereof, logical file, physical file, etc., one skilled in the art, with the benefit of this disclosure, will recognize that other formats or structures may also be used in the system and methods described without deviating from the spirit of the invention. For example, the logical file and/or physical file may be substituted by other suitable logical data structure and/or physical data structure, respectively, without deviating from the spirit of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources.

Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for data storage using a plurality of storage devices, comprising:

obtaining, by a processor of a computer system from a network data source, first and second data records that are delimited based on network data payload format of the network data source and independent of characteristics of the plurality of storage devices;

generating, by the processor and using a pre-determined algorithm for multiplexing the plurality of storage devices, first and second meta-data identifying first and second locations, respectively, in the plurality of storage devices to store the first and second data records, respectively, wherein the first and second meta-data comprise a size of the first and second locations;

combining the first data record and the first meta-data to generate a first composite data record;

combining the second data record and the second meta-data to generate a second composite data record;

storing, based on the first and second meta-data, the first and second composite data records concurrently in the first and second locations, respectively, wherein first and second write elapse time to store the first and second composite data records, respectively, are overlapped;

storing the first and second meta-data in a data store separate from the plurality of storage devices, wherein the first and second meta-data are indexed in the data store based on first and second identifiers of the first and second data records, respectively; and retrieving, in response to a request based on the first and second identifiers, the first and second data records concurrently from the plurality of storage devices using the first and second meta-data, respectively, wherein first and second read elapse time to retrieve the first and second data records, respectively, are overlapped, wherein retrieving the first data record based on the first identifier comprises:

retrieving, using the first identifier, the first meta-data from the data store to generate retrieved first meta-data;

extracting, from the retrieved first meta-data, information regarding the first location;

retrieving, based on the information regarding the first location, the first composite data record from the first location to generate retrieved first composite data record;

comparing the retrieved first composite data record to the retrieved first meta-data to determine a mismatch; and generating an alert, in response to the mismatch.

2. The method of claim 1, wherein comparing the retrieved first composite data record to the retrieved first meta-data comprises comparing the retrieved first composite data record to the information regarding the first location.

3. The method of claim 1, wherein generating the first and second meta-data comprises:
determining using the pre-determined algorithm, first and second file paths based on first and sequential positions of the first and second data records, respectively, in the data stream, wherein the first file path points to a first file comprising the first location and stored in a first storage device of the plurality of storage devices, wherein the second file path points to a second file comprising the second location and stored in a second storage device of the plurality of storage devices;
including, in the first meta-data, the first file path, a first length of the first data record, and a first offset representing a first next available position in the first file; and
including, in the second meta-data, the second file path, a second length of the second data record, and a second offset representing a second next available position in the second file.

4. The method of claim 3,
wherein the first next available position in the first file comprises a current end-of-file position in the first file,
wherein storing the first data record in the first location is a result of appending the first data record to the first file,
wherein the current end-of-file position is advanced by the first length of the first data record in response to appending the first data record to the first file.

5. The method of claim 3, further comprising:
determining, prior to storing the first data record, the first location based on the first meta-data using the first file path and the first next available position in the first file.

6. The method of claim 3, wherein retrieving the first data record based on the first identifier comprises:
retrieving, using the first identifier, the first meta-data from the data store to generate retrieved first meta-data;
extracting, from the retrieved first meta-data, the first file path and the first next available position in the first file;
determining, prior to retrieving the first data record, the first location based on the retrieved first meta-data using the first file path and the first next available position in the first file.

7. The method of claim 1,
wherein the pre-determined algorithm for multiplexing the plurality of storage devices identifies a weighted round robin multiplex sequence comprising sequence elements selecting among at least the first and second storage devices for storing data records from the network data source,
wherein the weighted round robin multiplex sequence further comprises a first frequency of the sequence elements selecting the first storage device and a second frequency of the sequence elements selecting the second storage device, and
wherein the first frequency is proportional to a first performance attribute of the first storage device, and the second frequency is proportional to a second performance attribute of the second storage device.

8. A system for data storage using a plurality of storage devices, comprising:
a plurality of storage devices;
a processor and memory storing instructions, when executed by the processor comprising functionality to:
obtain, from a network data source, first and second data records that are delimited based on network data payload format of the network data source and independent of characteristics of the plurality of storage devices;
generate, using a pre-determined algorithm for multiplexing the plurality of storage devices, first and second meta-data identifying first and second locations, respectively, in the plurality of storage devices to store the first and second data records, respectively, wherein the first and second meta-data comprise a size of the first and second locations;
combine the first data record and the first meta-data to generate a first composite data record;
combine the second data record and the second meta-data to generate a second composite data record;
store, based on the first and second meta-data, the first and second composite data records concurrently in the first and second locations, respectively, wherein first and second write elapse time to store the first and second composite data records, respectively, are overlapped;
store the first and second meta-data in a data store separate from the plurality of storage devices, wherein the first and second meta-data are indexed in the data store based on first and second identifiers of the first and second data records, respectively; and
retrieve, in response to a request based on the first and second identifiers, the first and second data records concurrently from the plurality of storage devices using the first and second meta-data, respectively, wherein first and second read elapse time to retrieve the first and second data records, respectively, are overlapped,
wherein retrieving the first data record based on the first identifier comprises:
retrieving, using the first identifier, the first meta-data from the data store to generate retrieved first meta-data;
extracting, from the retrieved first meta-data, information regarding the first location;
retrieving, based on the information regarding the first location, the first composite data record from the first location to generate retrieved first composite data record;
comparing the retrieved first composite data record to the retrieved first meta-data to determine a mismatch; and
generating an alert, in response to the mismatch.

9. The system of claim 8,
wherein comparing the retrieved first composite data record to the retrieved first meta-data comprises comparing the retrieved first composite data record to the information regarding the first location.

10. The system of claim 8, wherein generating the first and second meta-data comprises:
determining using the pre-determined algorithm, first and second file paths based on first and sequential positions of the first and second data records, respectively, in the data stream, wherein the first file path points to a first file comprising the first location and stored in a first storage device of the plurality of storage devices, wherein the second file path points to a second file comprising the second location and stored in a second storage device of the plurality of storage devices;
including, in the first meta-data, the first file path, a first length of the first data record, and a first offset representing a first next available position in the first file; and
including, in the second meta-data, the second file path, a second length of the second data record, and a second offset representing a second next available position in the second file.

11. The system of claim 10,
wherein the first next available position in the first file comprises a current end-of-file position in the first file,
wherein storing the first data record in the first location is a result of appending the first data record to the first file,
wherein the current end-of-file position is advanced by the first length of the first data record in response to appending the first data record to the first file.

12. The system of claim 10, the instructions, when executed by the processor further comprising functionality to:
determine, prior to storing the first data record, the first location based on the first meta-data using the first file path and the first next available position in the first file.

13. The system of claim 10, wherein retrieving the first data record based on the first identifier comprises:
retrieving, using the first identifier, the first meta-data from the data store to generate retrieved first meta-data;
extracting, from the retrieved first meta-data, the first file path and the first next available position in the first file;
determining, prior to retrieving the first data record, the first location based on the retrieved first meta-data using the first file path and the first next available position in the first file.

14. The system of claim 8,
wherein the pre-determined algorithm for multiplexing the plurality of storage devices identifies a weighted round robin multiplex sequence comprising sequence elements selecting among at least the first and second storage devices for storing data records from the network data source,
wherein the weighted round robin multiplex sequence further comprises a first frequency of the sequence elements selecting the first storage device and a second frequency of the sequence elements selecting the second storage device, and
wherein the first frequency is proportional to a first performance attribute of the first storage device, and the second frequency is proportional to a second performance attribute of the second storage device.

15. A non-transitory computer readable medium embodying instructions for data storage using a plurality of storage devices, the instructions when executed by a processor comprising functionality for:
obtaining, from a network data source, first and second data records that are delimited based on network data payload format of the network data source and independent of characteristics of the plurality of storage devices;
generating, using a pre-determined algorithm for multiplexing the plurality of storage devices, first and second meta-data identifying first and second locations, respectively, in the plurality of storage devices to store the first and second data records, respectively, wherein the first and second meta-data comprise a size of the first and second locations;
combining the first data record and the first meta-data to generate a first composite data record;
combining the second data record and the second meta-data to generate a second composite data record;
storing, based on the first and second meta-data, the first and second composite data records concurrently in the first and second locations, respectively, wherein first and second write elapse time to store the first and second composite data records, respectively, are overlapped;
storing the first and second meta-data in a data store separate from the plurality of storage devices, wherein the first and second meta-data are indexed in the data store based on first and second identifiers of the first and second data records, respectively; and
retrieving, in response to a request based on the first and second identifiers, the first and second data records concurrently from the plurality of storage devices using the first and second meta-data, respectively, wherein first and second read elapse time to retrieve the first and second data records, respectively, are overlapped,
wherein retrieving the first data record based on the first identifier comprises:
retrieving, using the first identifier, the first meta-data from the data store to generate retrieved first meta-data;
extracting, from the retrieved first meta-data, information regarding the first location;
retrieving, based on the information regarding the first location, the first composite data record from the first location to generate retrieved first composite data record;
comparing the retrieved first composite data record to the retrieved first meta-data to determine a mismatch; and
generating an alert, in response to the mismatch.

16. The non-transitory computer readable medium of claim 15,
wherein comparing the retrieved first composite data record to the retrieved first meta-data comprises comparing the retrieved first composite data record to the information regarding the first location.

17. The non-transitory computer readable medium of claim 15, wherein generating the first and second meta-data comprises:
determining using the pre-determined algorithm, first and second file paths based on first and sequential positions of the first and second data records, respectively, in the data stream, wherein the first file path points to a first file comprising the first location and stored in a first storage device of the plurality of storage devices, wherein the second file path points to a second file comprising the second location and stored in a second storage device of the plurality of storage devices;
including, in the first meta-data, the first file path, a first length of the first data record, and a first offset representing a first next available position in the first file; and
including, in the second meta-data, the second file path, a second length of the second data record, and a second offset representing a second next available position in the second file.

18. The non-transitory computer readable medium of claim 17,
wherein the first next available position in the first file comprises a current end-of-file position in the first file,
wherein storing the first data record in the first location is a result of appending the first data record to the first file,
wherein the current end-of-file position is advanced by the first length of the first data record in response to appending the first data record to the first file.

19. The non-transitory computer readable medium of claim 17, the instructions when executed by the processor further comprising functionality for:
determining, prior to storing the first data record, the first location based on the first meta-data using the first file path and the first next available position in the first file.

20. The non-transitory computer readable medium of claim 17, wherein retrieving the first data record based on the first identifier comprises:

retrieving, using the first identifier, the first meta-data from the data store to generate retrieved first meta-data;

extracting, from the retrieved first meta-data, the first file path and the first next available position in the first file;

determining, prior to retrieving the first data record, the first location based on the retrieved first meta-data using the first file path and the first next available position in the first file.

21. The non-transitory computer readable medium of claim 15, wherein the pre-determined algorithm for multiplexing the plurality of storage devices identifies a weighted round robin multiplex sequence comprising sequence elements selecting among at least the first and second storage devices for storing data records from the network data source, wherein the weighted round robin multiplex sequence further comprises a first frequency of the sequence elements selecting the first storage device and a second frequency of the sequence elements selecting the second storage device, and wherein the first frequency is proportional to a first performance attribute of the first storage device, and the second frequency is proportional to a second performance attribute of the second storage device.

* * * * *